United States Patent
Nunome et al.

(10) Patent No.: US 9,190,655 B2
(45) Date of Patent: Nov. 17, 2015

(54) LITHIUM PRIMARY BATTERY

(75) Inventors: Jun Nunome, Kyoto (JP); Fumio Kato, Osaka (JP); Futoshi Tanigawa, Osaka (JP); Yoshiki Fukuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 304 days.

(21) Appl. No.: 13/824,716

(22) PCT Filed: Sep. 13, 2011

(86) PCT No.: PCT/JP2011/005135
§ 371 (c)(1),
(2), (4) Date: Apr. 23, 2013

(87) PCT Pub. No.: WO2012/066709
PCT Pub. Date: May 24, 2012

(65) Prior Publication Data
US 2013/0202933 A1  Aug. 8, 2013

(30) Foreign Application Priority Data

Nov. 15, 2010 (JP) .................. 2010-254410

(51) Int. Cl.
*H01M 4/02* (2006.01)
*H01M 4/06* (2006.01)
*H01M 4/13* (2010.01)
(Continued)

(52) U.S. Cl.
CPC ............... *H01M 4/06* (2013.01); *C22C 24/00* (2013.01); *H01M 4/0488* (2013.01); *H01M 4/13* (2013.01); *H01M 4/134* (2013.01); *H01M 4/405* (2013.01); *H01M 6/16* (2013.01); *H01M 6/164* (2013.01); *H01M 6/166* (2013.01); *H01M 6/168* (2013.01);
(Continued)

(58) Field of Classification Search
CPC ............................. H01M 4/0488; H01M 4/13
USPC .......................................................... 429/94
See application file for complete search history.

(56) References Cited

U.S. PATENT DOCUMENTS 5,112,704 A    5/1992  Furukawa et al.
5,350,647 A *  9/1994  Hope et al. .................... 429/222
(Continued)

FOREIGN PATENT DOCUMENTS

JP  60-175374 A   9/1985
JP  03-037964     2/1991
(Continued)

OTHER PUBLICATIONS

English translation of Chinese Search Report issued in Chinese Application No. 201180055046.8 dated Dec. 31, 2014.
(Continued)

*Primary Examiner* — Basia Ridley
*Assistant Examiner* — James Erwin
(74) *Attorney, Agent, or Firm* — McDermott Will & Emery LLP

(57) ABSTRACT

A lithium primary battery includes a positive electrode 1 using iron sulfide as a positive electrode active material, a negative electrode 2 using a lithium alloy as a negative electrode active material, an electrode group 4 formed by winding the positive and negative electrodes 1, 2 with a separator 3 being interposed therebetween, and a non-aqueous electrolytic solution. The lithium alloy contains at least one of magnesium or tin in a range of 0.02-0.2 mol %.

4 Claims, 2 Drawing Sheets

(51) Int. Cl.
*H01M 4/04* (2006.01)
*C22C 24/00* (2006.01)
*H01M 4/40* (2006.01)
*H01M 6/16* (2006.01)
*H01M 4/134* (2010.01)

(52) U.S. Cl.
CPC ...... *H01M 2300/0025* (2013.01); *Y02E 60/122* (2013.01)

(56) References Cited

U.S. PATENT DOCUMENTS

| | | | |
|---|---|---|---|
| 6,200,704 B1* | 3/2001 | Katz et al. | 429/218.1 |
| 2004/0033191 A1* | 2/2004 | Wietelmann et al. | 423/499.1 |
| 2008/0233485 A1* | 9/2008 | Jito et al. | 429/332 |
| 2010/0203370 A1 | 8/2010 | Pozin et al. | |
| 2011/0059358 A1 | 3/2011 | Morigaki | |
| 2012/0028092 A1 | 2/2012 | Nunome et al. | |

FOREIGN PATENT DOCUMENTS

| | | |
|---|---|---|
| JP | 2005-100769 A | 4/2005 |
| JP | 2005-529467 A | 9/2005 |
| JP | 2007-066826 A | 3/2007 |
| JP | 2008-525966 A | 7/2008 |
| WO | WO-03/105255 A2 | 12/2003 |
| WO | 2005/055347 A2 | 6/2005 |
| WO | WO-2006/069011 A1 | 6/2006 |
| WO | WO-2011/039924 A1 | 4/2011 |

OTHER PUBLICATIONS

International Search Report issued in International Patent Application No. PCT/JP2011/005135 dated Dec. 6, 2011.

English translation of Chinese Office Action dated on May 11, 2015 issued in Chinese Patent Application No. 201180055046.8.

* cited by examiner

LITHIUM PRIMARY BATTERY

RELATED APPLICATIONS

This application is the U.S. National Phase under 35 U.S.C. §371 of International Application No. PCT/JP2011/005135, filed on Sep. 13, 2011, which in turn claims the benefit of Japanese Application No. 2010-254410, filed on Nov. 15, 2010, the disclosures of which Applications are incorporated by reference herein.

TECHNICAL FIELD

The present invention relates to a lithium primary battery using iron sulfide as a positive electrode active material.

BACKGROUND ART

Lithium primary batteries each using iron sulfide as a positive electrode active material (hereinafter merely referred to as "lithium primary batteries") are highly practical because the lithium primary batteries have average discharge voltage of around 1.5 V and are compatible with other 1.5 V-class primary batteries such as manganese batteries and alkaline manganese batteries. A theoretical capacity of iron sulfide used as the positive electrode active material is as high as about 894 mAh/g, and a theoretical capacity of lithium used as a negative electrode active material is as high as about 3863 mAh/g. Thus, the lithium primary batteries are highly practical as high-capacity lightweight primary batteries.

Of the lithium primary batteries, a lithium primary battery including an electrode group formed by spirally winding a positive electrode and a negative electrode with a separator being interposed therebetween and a cylindrical battery case in which the electrode group is accommodated together with a non-aqueous electrolytic solution has a larger area where the positive and negative electrodes face each other. Thus, such a lithium primary battery has excellent discharge properties under a high load.

Iron sulfide used as the positive electrode active material can be industrially synthesized, but naturally exists as pyrite. Thus, if the positive electrode active material is formed by crushing pyrite, a material cost of the positive electrode active material can be decreased.

However, natural ore may contain impurities, or iron sulfide may react with water or air to generate sulfate iron in the course of forming powder of the positive electrode active material by crushing natural ore. In the case where the positive electrode active material contains such impurities, there is a possibility that the impurities are dissolved from the positive electrode in the non-aqueous electrolytic solution, and that, e.g., iron ions move to the negative electrode and are deposited on the negative electrode. As a result, the following disadvantage is caused: the discharge properties are degraded when dendrites of the grown iron penetrate the separator to cause a minor short circuit.

For the foregoing disadvantage, Patent Document 1 describes a technique to reduce or prevent a minor short circuit in such a manner that a pH value for iron sulfide used as a positive electrode active material is adjusted to a predetermined minimum value to lower solubility of impurities and reduce generation of dendrites.

In the case where lithium used as the negative electrode active material is used for the negative electrode as lithium foil, part of the negative electrode may be raptured in the wounded electrode group due to low tensile strength, resulting in degradation of the discharge properties. Moreover, if the raptured negative electrode penetrates the separator, a disadvantage that an internal short circuit occur is caused.

For the foregoing disadvantage, Patent Document 2 describes a technique to reduce or prevent rapture of a negative electrode in such a manner that a lithium alloy formed by alloying lithium with aluminum is used for the negative electrode to increase the tensile strength of lithium alloy foil.

Moreover, in addition to aluminum, Patent Document 3 describes mercury, zinc, and magnesium as metal which can be alloyed with lithium.

CITATION LIST

Patent Document

PATENT DOCUMENT 1: Japanese Translation of PCT International Application No. 2008-525966
PATENT DOCUMENT 2: Japanese Translation of PCT International Application No. 2005-529467
PATENT DOCUMENT 3: Japanese Patent Publication No. S60-175374

SUMMARY OF THE INVENTION

Technical Problem

As described above, the lithium primary batteries each including the electrode group formed by winding the positive and negative electrodes with the separator being interposed therebetween have the excellent discharge properties under the high load.

However, only the excellent discharge properties under the high load cannot broadly respond to customer needs. For such a reason, customers have demanded lithium primary batteries having not only the excellent discharge properties under the high load but also excellent discharge properties under an intermediate load.

It is an objective of the present invention to realize, in a lithium primary battery including an electrode group formed in such a manner that a positive electrode using iron sulfide as a positive electrode active material and a negative electrode using lithium as a negative electrode active material are wounded with a separator being interposed therebetween, high versatility of the lithium primary battery, maintenance of discharge properties under a high load, and improvement of discharge properties under an intermediate load.

Solution to the Problem

In order to accomplish the foregoing objective, the configuration in which a lithium alloy containing a predetermined amount of at least one of magnesium or tin is used for a negative electrode is employed for a lithium primary battery of the present invention using iron sulfide for a positive electrode.

That is, the present invention is intended for a lithium primary battery including a positive electrode using iron sulfide as a positive electrode active material; a negative electrode using a lithium alloy as a negative electrode active material; an electrode group formed by winding the positive and negative electrodes with a separator being interposed therebetween; and a non-aqueous electrolytic solution. The lithium alloy contains at least one of magnesium or tin in a range of 0.02-0.2 mol %.

Advantages of the Invention

According to the present invention, a versatile lithium primary battery using iron sulfide for a positive electrode can be realized with maintenance of discharge properties under a high load and improvement of discharge properties under an intermediate load.

DESCRIPTION OF EMBODIMENTS

As described above, as long as natural iron sulfide is used as a positive electrode active material, it is inevitable that impurities are contained in the positive electrode active material. If high-purity iron sulfide is used, the iron sulfide reacts with water or air to generate sulfate iron in the course of forming the positive electrode active material. As a result, there are impurities in the positive electrode active material.

If the impurities are contained in the positive electrode active material, iron ions or sulfate ions may be dissolved from the positive electrode active material in a non-aqueous electrolytic solution and may be deposited on a negative electrode as some kind of compound.

Conventionally, dendrites of the impurities deposited on the negative electrode have been considered as a disadvantage causing an internal short circuit. The present inventors have considered an influence on a reaction of lithium by the impurities deposited on the negative electrode, and have founded as follows.

Figure 1:
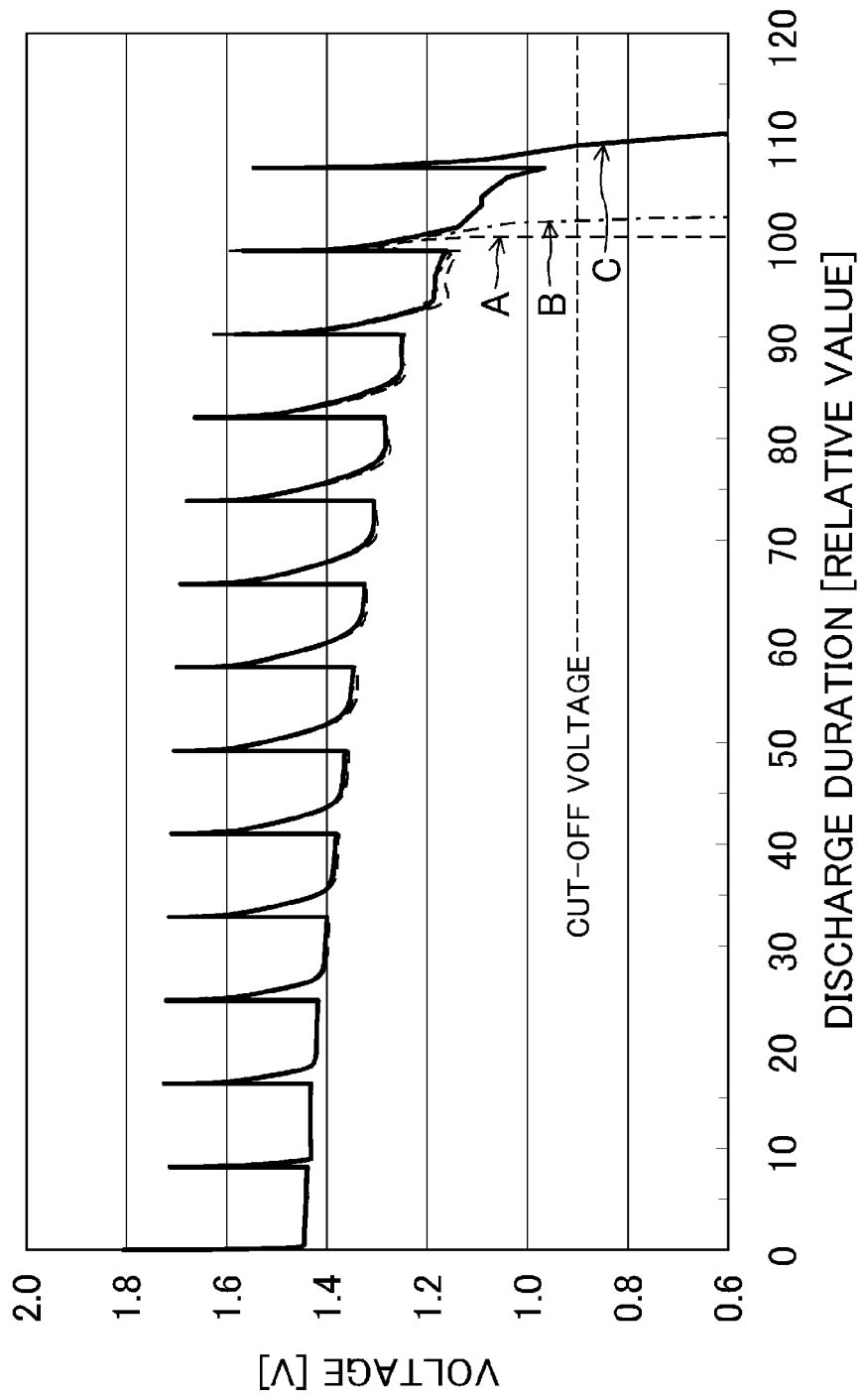
FIG. 1 is a graph illustrating discharge properties of a lithium primary battery under an intermediate load.

FIG. 1 is a graph for lithium primary batteries each formed by using, as a negative electrode active material, lithium, a lithium alloy which is alloyed with aluminum, or a lithium alloy which is alloyed with magnesium, and illustrates measurement results of discharge properties of each of lithium primary batteries under an intermediate load.

For the discharge properties under the intermediate load, a duration between the following points was measured: the point at which the formed lithium primary battery discharges 2.5% of a theoretical positive electrode capacity in advance and the point at which a cycle that the lithium primary battery discharges at 250 mA in atmosphere of 20° C. for 1 hour and then enters a rest state for 11 hours is repeated until closed circuit voltage reaches 0.9 V.

In the graph illustrated in FIG. 1, a curve A indicates the discharge properties of the lithium primary battery under the intermediate load in the case where lithium metal is used as the negative electrode active material, a curve B indicates the discharge properties of the lithium primary battery under the intermediate load in the case where a lithium alloy containing aluminum of 0.1 mol % is used as the negative electrode active material, and a curve C indicates the discharge properties of the lithium primary battery under the intermediate load in the case where a lithium alloy containing magnesium of 0.1 mol % is used as the negative electrode active material. The discharge duration indicated by the horizontal axis is a relative value when the discharge duration in the case where lithium metal is used as the negative electrode active material is "100."

Referring to FIG. 1, in the lithium primary batteries respectively using lithium metal and a lithium alloy containing aluminum as the negative electrode active material, voltage sharply drops at a late stage of discharge. On the other hand, in the lithium primary battery using a lithium alloy containing magnesium, the graph shows no sharp voltage drop at the late stage of discharge, and the discharge duration was, as a result, increased by about 10%. That is, in the lithium primary battery using a lithium alloy containing magnesium, the discharge properties under the intermediate load were improved. Moreover, it was confirmed that internal resistance of the battery estimated by measurement using a complex impedance method is smaller in the lithium primary battery using a lithium alloy containing magnesium than in the lithium primary batteries respectively using lithium metal and a lithium alloy containing aluminum.

There was almost no difference in discharge properties under a high load among the lithium primary batteries respectively using lithium metal, a lithium alloy containing aluminum, a lithium alloy containing magnesium as the second electrode active material.

The present inventors have considered that the discharge properties under the intermediate load were improved in the case where a lithium alloy containing magnesium is used as the negative electrode active material because of the following reasons.

That is, as described above, if impurities are contained in the positive electrode active material, the impurities are dissolved from the positive electrode active material in the non-aqueous electrolytic solution and are deposited on the negative electrode as some kind of compound. It is assumed that the deposit provides some influence on the discharge properties in association with an increase in reaction resistance at a lithium surface. The deposit derived from the impurities may be a sulfated compound or an iron based compound. Particularly in discharge under the intermediate load, the battery is used to a large depth of discharge, and therefore the area of lithium is decreased at the late stage of discharge. Thus, if the deposit is on the lithium surface, the rate of utilization of lithium is decreased by the deposit. As a result, the discharge duration is shortened.

On the other hand, in discharge under the high load, discharge is terminated by polarization of the positive electrode, and therefore there is almost no change in area of lithium. Thus, even if the deposit is on the lithium surface, the decrease in rate of utilization of lithium is much less likely to occur. As a result, there is almost no influence on the discharge properties under the high load.

Since lithium is metal having the lowest potential among metal elements, impurities are likely to be deposited on a lithium surface. In the case where lithium is alloyed, since a solubility state of the alloyed metal is not entirely uniform, it is assumed that non-uniformity in potential (i.e., the state in which the degree of potential varies) occurs at a surface of the lithium alloy. Magnesium has a potential higher than that of aluminum. Thus, in the case where each of magnesium and aluminum is alloyed with lithium in the same proportion (0.1 mol %), impurities are less likely to be deposited on a surface of a lithium alloy containing magnesium than on a surface of a lithium alloy containing aluminum. Potential localization at a surface of a lithium alloy varies among metal elements. Thus, the potential localization is more likely to occur in a lithium alloy containing magnesium than in a lithium alloy containing aluminum. This brings about the assumption that impurities are less likely to be deposited on a surface of a lithium alloy.

Based on the foregoing findings, the present inventors have found an advantage that a lithium alloy containing magnesium is used as the negative electrode active material to maintain the discharge properties under the high load and improve the discharge properties under the intermediate load, and have arrived at the present invention.

An embodiment of the present invention will be described below in detail with reference to drawings. Note that the present invention is not limited to the embodiment described below. Moreover, modifications can be made as necessary without departing from the scope of the present invention. In addition, the present embodiment can be combined with other embodiment(s).

Figure 2:
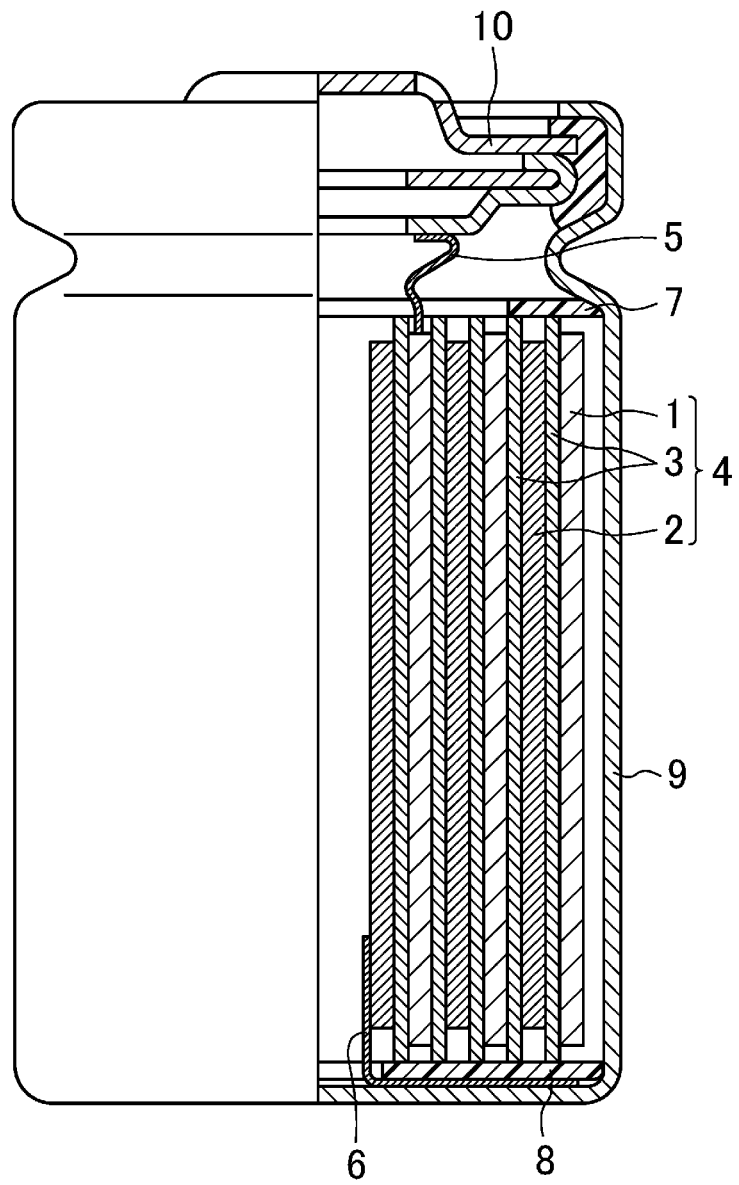
FIG. 2 is a half cross-sectional view illustrating a configuration of a lithium primary battery of an embodiment of the present invention.

FIG. 2 is a half cross-sectional view illustrating a configuration of a lithium primary battery of the embodiment of the present invention.

Referring to FIG. 2, the lithium primary battery of the present embodiment is configured such that an electrode group 4 formed by winding a positive electrode 1 using iron sulfide as a positive electrode active material and a negative electrode 2 using a lithium alloy as a negative electrode active material with a separator 3 being interposed therebetween is accommodated together with a non-aqueous electrolytic solution (not shown in the figure) in a battery case 9. An opening of the battery case 9 is sealed with a sealing plate 10 which also functions as a positive electrode terminal.

The positive electrode 1 is connected to the sealing plate 10 through a positive electrode lead 5, and the negative electrode 2 is connected to a bottom surface of the battery case 9 through a negative electrode lead 6. Insulators 7, 8 are arranged respectively at upper and lower ends of the electrode group 4. The positive electrode 1 includes a positive electrode current collector (e.g., aluminum) and a positive electrode mixture supported on the current collector. The positive electrode mixture contains the positive electrode active material containing iron sulfide as a main ingredient, a binder, a conductive agent, etc.

In the lithium primary battery of the present invention using iron sulfide for the positive electrode 1, the configuration in which a lithium alloy containing magnesium is used for the negative electrode 2 is employed.

Table 1 shows a suitable range of a content of magnesium contained in a lithium alloy, and the discharge properties under the intermediate load can be improved in such a range.

TABLE 1

|  | Mg Content (mol %) | Discharge Duration (Relative Value) |
| --- | --- | --- |
| Battery A1 | 0.00 | 100 |
| Battery A2 | 0.01 | 101 |
| Battery A3 | 0.02 | 105 |
| Battery A4 | 0.10 | 109 |
| Battery A5 | 0.17 | 108 |
| Battery A6 | 0.20 | 107 |
| Battery A7 | 0.30 | 102 |

In Table 1, the batteries A1-A7 are lithium primary batteries respectively including negative electrodes 2 having different contents of magnesium contained in a lithium alloy within a range of 0-0.30 mol % and having the configuration illustrated in FIG. 2. Note that each of the lithium primary batteries was formed in the following steps.

Iron sulfide, a conductive agent (acetylene black), and a binder (polytetrafluoroethylene (PTFE)) were mixed together at a ratio of 94.0:3.5:2.5 (mass %) to form a positive electrode mixture, and then the positive electrode mixture was applied to a positive electrode current collector (aluminum foil) and is dried. Then, the resultant was rolled so as to have a width of 42 mm, an electrode plate length of 270 mm, and a thickness of 0.21 mm. In the foregoing manner, a positive electrode 1 was formed.

The formed positive electrode 1 and a negative electrode 2 made of lithium alloy foil containing magnesium were wounded in the state in which a separator 3 made of a microporous polyethylene membrane having a thickness of 25 μm is interposed between the positive electrode 1 and the negative electrode 2, thereby forming an electrode group having an outer diameter of 13.1 mm. In a battery case 9, the electrode group was accommodated together with a non-aqueous electrolytic solution formed by adding an electrolyte made of lithium iodide (LiI) to a solvent mixture of dioxolan (DIOX), dimethoxyethane (DME), and tetrahydrofuran (THF) (at a volume ratio of 59:40:1). In the foregoing manner, an AA lithium primary battery was formed.

The thickness of the negative electrode 2 made of lithium alloy foil was controlled such that a ratio (i.e., Theoretical Negative Electrode Capacity/Theoretical Positive Electrode Capacity) between theoretical capacities of the positive electrode 1 and the negative electrode 2 facing each other per unit area is 0.85. Note that a theoretical capacity of iron sulfide used as the positive electrode active material was 894 mAh/g.

For the discharge properties under the intermediate load, a discharge duration between the following points was measured: the point at which the formed lithium primary battery discharges 2.5% of the theoretical positive electrode capacity in advance and the point at which a cycle that the lithium primary battery discharges at 250 mA in atmosphere of 20° C. for 1 hour and then enters a rest state for 11 hours is repeated until closed circuit voltage reaches 0.9 V. Note that the discharge duration of each of the batteries A1-A7 shown in Table 1 is a relative value when the discharge duration of the battery A1 using lithium metal (the content of magnesium is 0%) for the negative electrode 2 is "100."

Table 1 shows that the discharge duration was significantly improved in the batteries A3-A6 each using, for the negative electrode, a lithium alloy containing magnesium in a content range of 0.02-0.2 mol %. This is because impurities of the positive electrode active material were, due to potential localization at a surface of a lithium alloy containing magnesium in a range of 0.02-0.2 mol %, less likely to be deposited on the lithium alloy surface, and therefore occurrence of a decrease in rate of utilization of lithium at a late stage of discharge was reduced. Note that an advantage that the discharge duration is improved was less likely to be realized in the battery A7 containing magnesium of 0.3 mol %. This is because a too high magnesium content resulted in reaction inhabitation at a lithium alloy surface, and therefore a discharge performance was lowered.

More preferably, the discharge duration can be, as shown in Table 1, further improved in such a manner that the content of magnesium falls within a range of 0.10-0.17 mol % (batteries A4-A5).

In the lithium primary battery of the present invention using, for the negative electrode, a lithium alloy containing a predetermined amount of magnesium, the advantage that the discharge properties under the intermediate load are significantly improved is realized because magnesium is a metal element having a potential higher than that of aluminum.

Based on the foregoing findings, since tin is also a metal element having a potential higher than that of aluminum, an advantage similar to that realized by magnesium is expected.

Table 2 is for lithium primary batteries B1-B7 respectively including negative electrodes 2 having different contents of tin contained in a lithium alloy within a range of 0-0.30 mol % and having the configuration illustrated in FIG. 2, and shows measurement results of a discharge duration in intermediate-load discharge as in Table 1. Note that the discharge duration of each of the batteries B1-B7 shown in Table 2 is a relative value when the discharge duration of the battery B1 using lithium metal (the content of tin is 0%) for the negative electrode 2 is "100." Moreover, components of the lithium primary battery other than the negative electrode 2 were formed in steps similar to those described with reference to Table 1.

TABLE 2

|  | Sn Content (mol %) | Discharge Duration (Relative Value) |
| --- | --- | --- |
| Battery B1 | 0.00 | 100 |
| Battery B2 | 0.01 | 101 |
| Battery B3 | 0.02 | 105 |
| Battery B4 | 0.10 | 107 |
| Battery B5 | 0.17 | 106 |
| Battery B6 | 0.20 | 105 |
| Battery B7 | 0.30 | 101 |

Table 2 shows that the discharge duration was significantly improved in the batteries B3-B6 each using, for the negative electrode, a lithium alloy containing tin in a content range of 0.02-0.2 mol %. This is because impurities of the positive electrode active material were, due to potential localization at a surface of a lithium alloy containing tin in a range of 0.02-0.2 mol %, less likely to be deposited on the lithium alloy surface, and therefore occurrence of a decrease in rate of utilization of lithium at a late stage of discharge was reduced. Note that an advantage that the discharge duration is improved was less likely to be realized in the battery B7 containing tin of 0.3 mol %. This is because a too high tin content resulted in reaction inhabitation at a lithium alloy surface, and therefore a discharge performance was lowered.

More preferably, the discharge duration can be, as shown in Table 2, further improved in such a manner that the content of tin falls within a range of 0.10-0.17 mol % (batteries B4-B5).

Based on the results shown in Tables 1 and 2, magnesium and tin bring about the almost similar functions and advantages for improvement of the discharge properties under the intermediate load. Thus, by using a lithium alloy containing at least one of magnesium or tin for the negative electrode, significant improvement of the discharge properties under the intermediate load can be expected.

Table 3 is for lithium primary batteries C1-C6 respectively including negative electrodes 2 having different total contents of magnesium and tin contained in a lithium alloy within a range of 0.010-0.25 mol % and having the configuration illustrated in FIG. 2, and shows measurement results of a discharge duration in intermediate-load discharge as in Table 1. Note that the discharge duration of each of the batteries C1-C6 shown in Table 3 is a relative value when the discharge duration of the battery A1 using lithium metal for the negative electrode 2 is "100." Moreover, components of the lithium primary battery other than the negative electrode 2 were formed in steps similar to those described with reference to Table 1.

TABLE 3

|  | Mg Content (mol %) | Sn Content (mol %) | Mg, Sn Content (mol %) | Discharge Duration (Relative Value) |
| --- | --- | --- | --- | --- |
| Battery C1 | 0.005 | 0.005 | 0.01 | 102 |
| Battery C2 | 0.01 | 0.01 | 0.02 | 107 |
| Battery C3 | 0.05 | 0.05 | 0.10 | 108 |
| Battery C4 | 0.07 | 0.10 | 0.17 | 107 |
| Battery C5 | 0.10 | 0.10 | 0.20 | 105 |
| Battery C6 | 0.15 | 0.10 | 0.25 | 102 |

Table 3 shows that the discharge duration was significantly improved in the batteries C2-C5 each using, for the negative electrode, a lithium alloy containing magnesium and tin in a total content range of 0.02-0.2 mol %. This is because impurities of the positive electrode active material were, due to potential localization at a surface of a lithium alloy containing magnesium and tin in a range of 0.02-0.2 mol %, less likely to be deposited on the lithium alloy surface, and therefore occurrence of a decrease in rate of utilization of lithium at a late stage of discharge was reduced. Note that an advantage that the discharge duration is improved was less likely to be realized in the battery C6 containing magnesium and tin of 0.25 mol % in total. This is because a too high magnesium-tin content resulted in reaction inhabitation at a lithium alloy surface, and therefore a discharge performance was lowered.

More preferably, the discharge duration can be, as shown in Table 3, further improved in such a manner that the total content of magnesium and tin falls within a range of 0.10-0.17 mol % (batteries C3-C4).

As described above, in the lithium primary battery including the positive electrode 1 using iron sulfide as the positive electrode active material, the negative electrode 2 using a lithium alloy as the negative electrode active material, the electrode group 4 formed by winding the positive electrode 1 and the negative electrode 2 with the separator 3 being interposed therebetween, and the non-aqueous electrolytic solution, a lithium alloy containing at least one of magnesium or tin in a range of 0.02-0.2 mol % is used as the negative electrode active material. In such a manner, a versatile lithium primary battery is realized with maintenance of the discharge properties under the high load and improvement of the discharge properties under the intermediate load. Moreover, a lithium alloy preferably contains at least one of magnesium or tin in a range of 0.10-0.17 mol %.

Particularly in the case where the amount of a lithium alloy to be used for a lithium primary battery is limited, the present invention is effective because the rate of utilization of lithium at the late stage of discharge can be maximized.

A factor for degrading the discharge properties under the intermediate load may be that impurities (e.g., sulfate iron) are dissolved from a positive electrode active material in a non-aqueous electrolytic solution and then a compound is deposited on a negative electrode. It is considered that the impurities dissolved in the electrolytic solution are deposited on the negative electrode as iron sulfide or lithium sulfide through a complex reaction with components of the electrolytic solution.

Table 4 is for batteries D1, D2 respectively using lithium iodide (LiI) and bistrifluoromethylsulfonylamide lithium (LiTFSI) as an electrolyte and having the configuration illustrated in FIG. 2, and shows measurement results of a discharge duration in intermediate-load discharge as in Table 1 in order to examine an influence of an electrolyte of a non-aqueous electrolytic solution. Note that the discharge duration of each of the batteries D1-D2 shown in Table 4 is a relative value when the discharge duration of the battery A1 using lithium metal for the negative electrode 2 is "100." Moreover, a lithium alloy containing aluminum of 0.1 mol % was used as the negative electrode active material, and components of the lithium primary battery other than the electrolyte were formed in steps similar to those described with reference to Table 1.

TABLE 4

|  | Mg Content (mol %) | Electrolyte | Discharge Duration (Relative Value) |
|---|---|---|---|
| Battery D1 | 0.10 | LiI | 109 |
| Battery D2 | 0.10 | TFSI | 105 |

Table 4 shows that the discharge duration was improved in the battery D1 using LiI as the electrolyte as compared to the battery D2 using TFSI. This is because of the following assumption. LiI was dissolved in the electrolytic solution, and existed as lithium ions and iodine ions. Since the iodine ions reacted with a slight amount of water entering the battery, a reaction of sulfate iron or sulfate lithium deposited on the negative electrode was changed. As a result, reactivity on the negative electrode was improved.

Next, Table 5 is for batteries E1-E5 respectively using solvent mixtures each containing dioxolan (DOL), dimethoxyethane (DME), and tetrahydrofuran (THF), having different proportions of THF in a range of 0-10 vol %, and having the configuration illustrated in FIG. 2, and shows measurement results of a discharge duration in intermediate-load discharge as in Table 1 in order to examine an influence of an solvent of a non-aqueous electrolytic solution. Note that the discharge duration of each of the batteries E1-E5 shown in Table 5 is a relative value when the discharge duration of the battery A1 using lithium metal for the negative electrode 2 is "100." Moreover, a lithium alloy containing aluminum of 0.1 mol % was used as the negative electrode active material, and components of the lithium primary battery other than the solvent were formed in steps similar to those described with reference to Table 1.

TABLE 5

|  | Mg Content (mol %) | Electrolyte | Discharge Duration (Relative Value) |
|---|---|---|---|
| Battery E1 | 0.10 | 60/40/0 | 109 |
| Battery E2 | 0.10 | 59.5/40/0.5 | 110 |
| Battery E3 | 0.10 | 59/40/1 | 111 |
| Battery E4 | 0.10 | 58/37/5 | 110 |
| Battery E5 | 0.10 | 55/35/10 | 107 |

Table 5 shows that the discharge duration was significantly improved in the batteries E2-E4 each using the solvent containing tetrahydrofuran (THF) of 0.5-5 vol %. This may be because THF was relatively likely to be reduced at the potential of the negative electrode and the reduced product functioned as a protective coating to improve a discharge performance. Moreover, since the negative electrode contains magnesium or tin, a coating state of the THF reduced product may be, by a synergistic effect, improved as compared to the case of a conventional lithium negative electrode. The discharge duration was not much improved in the battery E5 using the solvent containing THF of 10 vol %. This may be because a too high THF proportion resulted in too many compounds formed by reducing THF and therefore inactivation of a reaction on the negative electrode or the positive electrode occurred.

The preferable embodiment of the present invention has been described above. However, the present is not limited to the foregoing description, and various modifications can be made. For example, a lithium alloy containing at least one of magnesium or tin is used as the negative electrode active material in the foregoing embodiment, but other metal elements such as aluminum may be contained within a range in which the advantages of the present invention can be realized.

INDUSTRIAL APPLICABILITY

The present invention is useful for a 1.5 V-class primary battery compatible with, e.g., an alkaline battery.

DESCRIPTION OF REFERENCE CHARACTERS

1 Positive Electrode
2 Negative Electrode
3 Separator
4 Electrode Group
5 Positive Electrode Lead
6 Negative Electrode Lead
7, 8 Insulator
9 Battery Case
10 Sealing Plate

The invention claimed is:
1. A lithium primary battery, comprising:
a positive electrode using iron sulfide as a positive electrode active material;
a negative electrode using a lithium alloy as a negative electrode active material;
an electrode group formed by winding the positive and negative electrodes with a separator being interposed therebetween; and
a non-aqueous electrolytic solution,
wherein the lithium alloy contains at least one of magnesium or tin as an additive, a total amount of the additive being in a range of 0.02-0.2 mol %.
2. The lithium primary battery of claim 1, wherein the lithium alloy contains at least one of magnesium or tin in a range of 0.10-0.17 mol %.
3. The lithium primary battery of claim 1, wherein the non-aqueous electrolytic solution contains an electrolyte made of lithium iodide.
4. The lithium primary battery of claim 1, wherein a solvent of the non-aqueous electrolytic solution contains tetrahydrofuran in a range of 0.5-5 vol %.

* * * * *